June 3, 1941.    F. A. DOWLER    2,244,143
TAP DRIVING CHUCK
Filed May 28, 1940
*Fig-1-*    *Fig-2-*
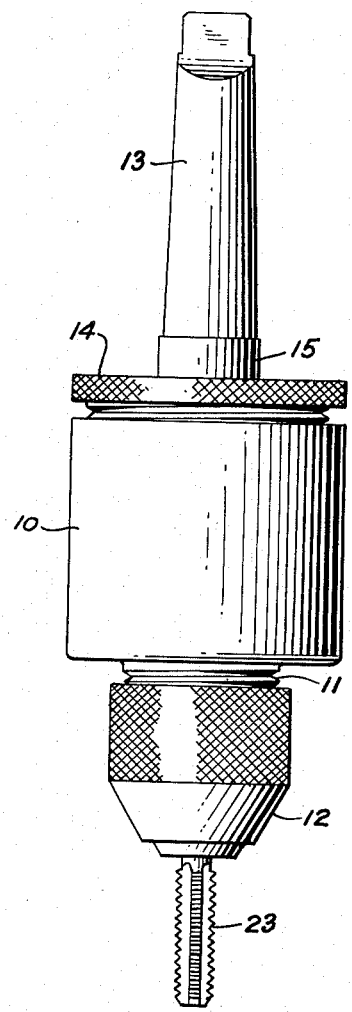 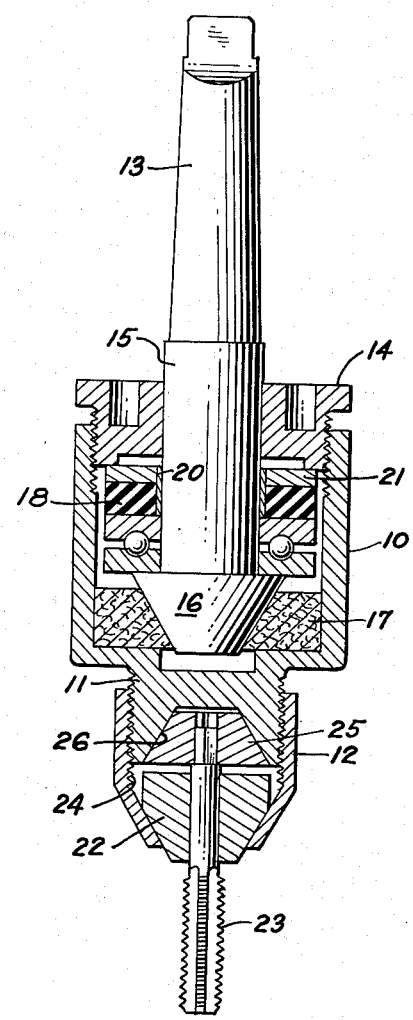
INVENTOR.
Frank A. Dowler
BY
Wm H. Atkinson
ATTORNEY.

Patented June 3, 1941

2,244,143

UNITED STATES PATENT OFFICE 2,244,143

TAP DRIVING CHUCK

Frank A. Dowler, Alameda, Calif., assignor to Pacific Electric Manufacturing Corporation, San Francisco, Calif., a corporation of California Application May 28, 1940, Serial No. 337,612

4 Claims. (Cl. 10—135)

My present invention relates to tap and drill driving tools, and more particularly to an improvement wherein means is provided independently of a tap or drill supporting chuck which will permit a slipping of the chuck with respect to its driving means in the event that the tap or drill bottoms or becomes subjected to a strain in excess of that for which it is designed.

An object of the invention is to provide a frictional driving means for a tap or drill supporting chuck which is adjustable independently of the tap or drill engaging elements of the chuck and which is simple in construction and efficient in operation.

Another object of my invention is to provide a frictional driving means for driving taps and like tools which will operate independently of the tap or tool engaging jaws of the chuck and which will not be influenced by heat generated through the operation of the tap or drill upon the work.

Another object of the invention is to provide an adjustable friction driving means for a tap carrying chuck in which metallic and non-metallic cooperating parts are employed to provide the frictional driving connection in a new and novel manner.

Another object of my invention is to provide an adjustable friction driving means for a tap supporting chuck in which contact pressure between the frictional engaging surfaces is provided by live rubber.

Other objects and advantages of the invention will be in part evident to those skilled in the art and in part pointed out hereinafter as the description taken in connection with the accompanying drawing proceeds.

In the drawing, wherein there is shown by way of illustration and not of limitation a preferred embodiment of the invention:

Figure 1 is an external view of a tap driving tool constructed in accordance with the invention, and Figure 2 is a vertical sectional view of the tap driving tool shown in Figure 1.

As illustrated in the drawing, my improved tap and/or drill driving tool, in its simplest and most practical form, comprises a body member 10 having a threaded extension 11 at its lower end to which the elements of a tap or drill carrying chuck 12 are attached. The body member 10 is carried by a spindle 13 that extends through an axially adjustable guide member 14 which, as shown in Figure 2 of the drawing, is threaded into the upper open end of the body member 10.

As shown, the spindle 13, in addition to having the usual tapered end portion which is adapted to be inserted in the end of the driving shaft of a tapping machine or a drill press, also has a cylindrical portion 15 and an enlarged head 16 of inverted conical configuration. To provide a driving connection between the spindle 13 and the chuck 12, the body member 10 carries an annular non-metallic friction surface providing means 17 which is preferably of hard fiber. This arrangement provides a slipping clutch having metal to non-metal friction surfaces which are not subject to freezing and/or sticking, such as is prevalent in frictional driving connections wherein metal to metal surfaces are provided and has the further advantage that it may be operated without the use of a lubricant.

Disposed about the cylindrical portion 15 of the spindle 13 and above the enlarged head 16 there is a yielding rubber cushion 18 which is adapted to be placed under any desired degree of compression by an adjustment of the guide member 14 upon the body member 10. In order to limit the frictional driving connection to the surfaces provided between the enlarged conical head 16 of the spindle 13 and the non-metallic frictional surface providing means 17, the yielding rubber cushion 18 is arranged to act through an anti-friction means or thrust bearing 19 which is interposed between it and the enlarged head 16 of the spindle 13. The yielding rubber cushion 18 is preferably formed of a good quality of live rubber, such as is known in the trade as die rubber. To prevent the rubber cushion 18 from rubbing upon the cylindrical portion 15 of the spindle 13, there is a loosely fitting cylindrical sleeve 20 that extends upwardly through the rubber cushion 18 and along the cylindrical portion 15 of the spindle 13. This sleeve 20 also serves to center a metallic washer 21 which is disposed between the rubber cushion 18 and the adjustable guide member 14.

While the particular construction of the chuck 12 is of no major importance in connection with the utilization of the present invention, it should be stated that this chuck means should be of such a character to center a tap or drill when gripped thereby. The particular chuck illustrated comprises a plurality of radially disposed jaws 22 that are adapted to be held in clamping engagement with the shank of a tap 23 by an adjustable tapered sleeve 24 threaded upon the extension 11 of the body member 10. This chuck, in addition to having the clamping jaws 22, also carries a pair of other clamping members 25 that are seated within a conical recess 26 of the threaded extension 11. These clamping members 25 provide oppositely disposed V notches that are adapted to engage the squared end, such as is provided upon standard thread cutting taps.

With the above described arrangement, it will be readily seen that I have produced a tap driving tool in which the danger of changes in the characteristics of the frictional driving connection is reduced to a minimum and consequently the tap driving force exerted therethrough, with any desired adjustment of the guide member 14 upon the body member 10, will be substantially uniform at all times. The importance of this feature will be clearly evident to those skilled in the art when compared with similar devices in which metal to metal parts are used as the cooperating frictional driving elements. For example, in these latter forms of devices when a slipping occurs between these surfaces, heat is generated which causes expansion of one or both of the parts. This results in an increase or a lessening of the amount of friction and it, therefore, becomes necessary to make an adjustment at this time which will overcome this slipping action. And while this adjustment might serve to permit a continuation of the tapping operation, it will be readily seen that when the device has cooled and is later put into use, a readjustment of the frictional surfaces will be required. In accordance with the present invention, this requirement of an adjustment and readjustment is eliminated as the live rubber cushion 18 is adapted to take care of any expansion and/or contraction which might take place in the members that provide the frictional driving surface and consequently, after the adjustable guide member 14 has been properly adjusted upon the body member 10 for a particular operation, no further adjustment will be found necessary as long as a tap of the same size is driven thereby.

While I have, for the sake of clearness and in order to disclose my invention so that the same can be readily understood, described and illustrated a specific form and arrangement of parts, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In a tap driving tool of the character described, the combination of a cylindrical body member having a tap supporting chuck at the lower end thereof, a driving spindle extending into said cylindrical body member and having an enlarged head with a conical friction driving surface at its end, a non-metallic conical friction surface forming means fixed within said body member and engaged by the conical friction surface of said enlarged head, live rubber pressure transmitting means disposed about said driving spindle and cooperating with the enlarged head upon said spindle to hold the conical friction surface thereof in frictional engagement with said non-metallic friction surface, and adjustable means carried by said body member and acting upon said live rubber pressure transmitting means adapted to determine the frictional driving connection between the friction driving surface upon the enlarged head of said spindle and said non-metallic friction surface.

2. In a tap driving tool of the character described, the combination of a cylindrical body member having an independent chuck with tap gripping members at the lower end thereof, a driving spindle extending into said cylindrical body member and having an enlarged shoulder forming head with a conical friction driving surface at its end, a non-metallic friction surface forming means within said body member and frictionally engaged by the conical driving surface of said enlarged head, an annular live rubber pressure transmitting means surrounding said spindle and cooperating with the enlarged head upon said spindle to hold the conical surface thereof in frictional engagement with said non-metallic friction surface forming means, and a threaded spindle guiding means carried by said body member and cooperating with said live rubber pressure transmitting means adapted by its adjustment upon said body member to compress said live rubber pressure transmitting means and thus determine the frictional driving connection between said non-metallic friction surface and the conical end of said spindle, whereby the driving connection between said spindle and said chuck may be varied independently of the tap gripping members of the chuck.

3. In a tap driving tool of the character described, the combination of an open ended cylindrical body member having an independent tap supporting chuck at the lower end thereof, a driving spindle extending into the open end of said cylindrical body member and having an enlarged head with a friction driving surface at its end, a non-metallic friction surface forming means fixed within said body member and frictionally engaged by the friction driving surface of said enlarged head, an axially adjustable guide member for said spindle threadedly secured to the open end of said cylindrical body member, anti-friction means carried by said spindle and located adjacent the enlarged head thereof, and a yielding pressure transmitting means between said anti-friction means and said axially adjustable guide member, whereby the frictional driving connection between the friction surfaces of said enlarged head and said non-metallic surface forming means may be varied by an adjustment of said guide member.

4. In a tap driving tool of the character described, the combination of an open ended cylindrical body member having an independent tap supporting chuck at the lower end thereof, a driving spindle extending into the open end of said cylindrical body member and having an enlarged head with a conical friction driving surface at its end, an annular non-metallic friction surface forming means secured within said body member and frictionally engaged by the conical driving surface of said enlarged head, an axially adjustable guide member for said spindle threaded into the open end of said cylindrical body member, anti-friction means carried by said spindle and abutting the enlarged head thereof, and a yielding pressure transmitting means between said anti-friction means and said axially adjustable guide member, whereby the frictional driving connection between the friction surfaces of said enlarged head and said non-metallic surface forming means may be varied independently of said tap supporting chuck.

FRANK A. DOWLER.